UNITED STATES PATENT OFFICE.

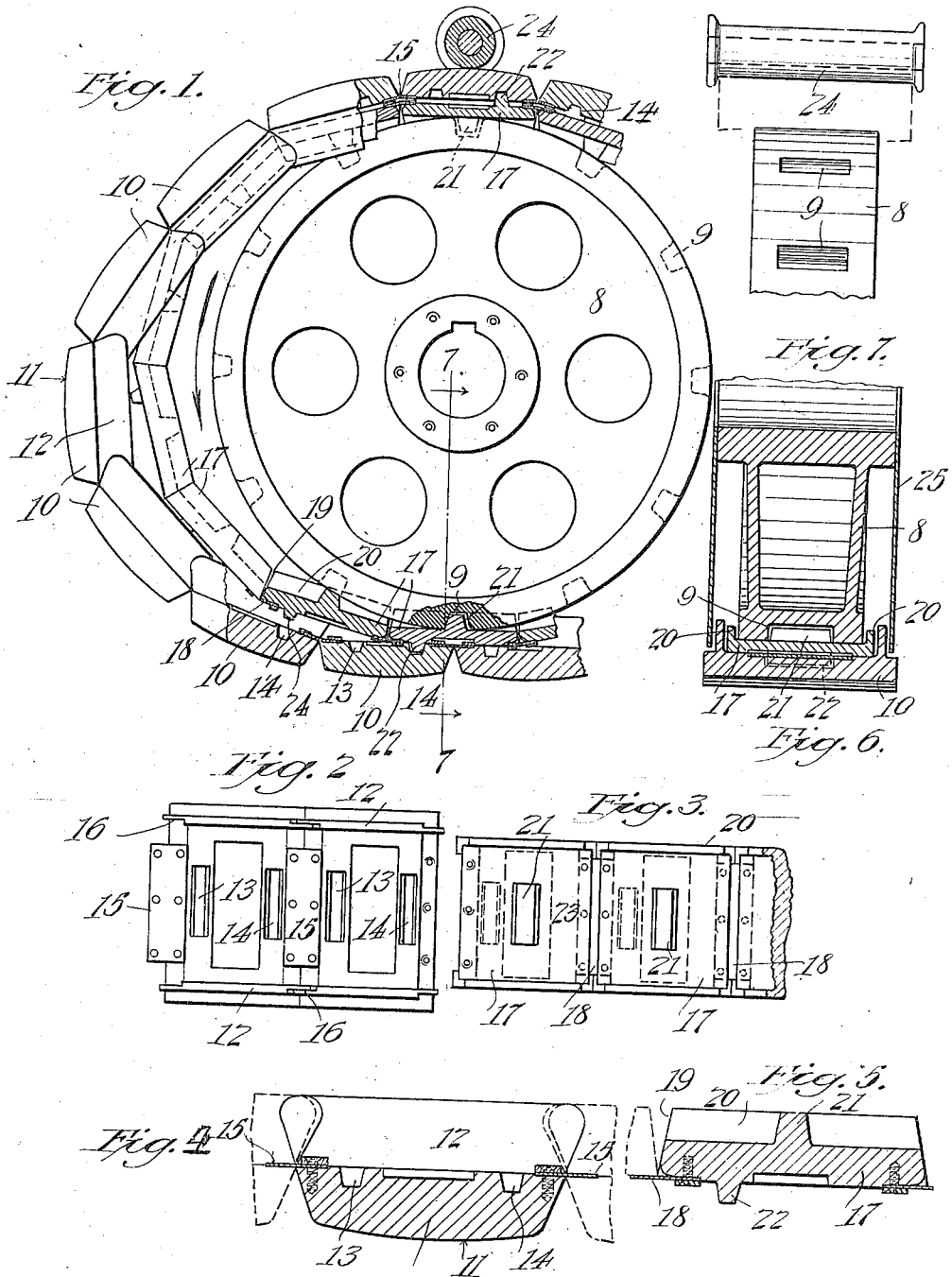

JOHN H. CARR, OF ALHAMBRA, CALIFORNIA.

PLATFORM-WHEEL.

1,068,563. Specification of Letters Patent. Patented July 29, 1913.

Application filed September 17, 1912. Serial No. 720,817.

*To all whom it may concern:*

Be it known that I, JOHN H. CARR, a citizen of the United States, residing at Alhambra, in the county of Los Angeles and State of California, have invented certain new and useful Improvements in Platform-Wheels, of which the following is a full, clear, and exact specification.

The present invention relates to wheels for wagons, traction engines, and other vehicles of that type employing an endless flexible platform or track, on which the wheel proper moves, and which progresses with it.

The primary object is to provide a novel structure of this type, which is entirely practicable, is highly effective, and has wear-resisting qualities of a special character, in that the relatively movable parts are protected from the ingress of dirt and the like.

An embodiment of the invention is illustrated in the accompanying drawings, wherein:—

Figure 1 is a side elevation of a wheel with the associated portion of the platform, parts being illustrated in section; Fig. 2 is a detail plan view of a portion of the shoe member; Fig. 3 is a similar view of a portion of the interposed belt member; Fig. 4 is a longitudinal sectional view on an enlarged scale through one of the shoe sections; Fig. 5 is a similar view through one of the belt sections; Fig. 6 is a detail cross sectional view on the line 7—7 of Fig. 1; and Fig. 7 is an end view of a portion of the wheel member with the roller thereover and the shoe and belt members removed.

Similar reference numerals designate corresponding parts in all the figures of the drawings.

In the drawings a wheel member 8 is employed that is mounted in any suitable manner on a driving shaft or axle (not shown), said wheel member having a peripheral portion in which are formed sockets 9. An endless shoe member extends around the wheel member 8 and comprises a plurality of shoe sections 10. Each section has a rounded bearing surface 11 and inwardly extending side flanges or walls 12 said flanges or walls forming in effect a channel. The rounded surfaces 11, besides giving the proper curved form to the shoe member when passing around the wheel member, also eliminates the "spatting" of the sections as they engage the ground or surface over which they travel. The inner faces of the sections 10 are also each provided with two sockets 13 and 14. The said sections are hinged together in any suitable manner, as for example, by spring plates 15, that extend across the joints between the sections and are suitably secured thereto. It will also be noted by reference to Figs. 2 and 4 that the side flanges 12 extend inwardly beyond the inner faces of the sections 10 and are cut away, as illustrated at 16, the cut-away portion being on one end of the flange and of one section on the opposite end of the adjacent section. These portions are disposed in overlapping relation, and stops are thereby produced which limited the inward swinging movement of the sections with relation to each other. It will also be observed that the sides of the sections 12 are beveled, and that the hinges are on the inner faces of the same. With this arrangement, the sections can swing with relation to each other, but their relative swinging movement is restricted.

Interposed between the shoe member and the wheel member, is an endless belt member, and this member is formed of sections 17 that are hingedly connected by strips or other suitable devices 18 arranged on their outer sides. The opposite side edges of the sections 17 are beveled, as illustrated at 19, which permits the necessary play of the sections, but limits their inward swinging movement, as will be evident by reference to Fig. 1. The sections 17 are reinforced by flanges 20 located at their end edges, and said sections are furthermore provided with inwardly extending teeth 21 that engage in the sockets 9 of the wheel at the upper and lower sides of said wheel as illustrated in Fig. 1. They are also provided on their outer surfaces with teeth 22, and the arrangement of the parts is such that each tooth 22 engages in the socket 13 of the adjacent shoe section above the wheel, as shown in Fig. 1, but engages in the socket 14 of said section beneath the wheel, as is also illustrated in Fig. 1. As a result, it will be noted that the sections 17 bridge the joints between the sections 10 below the wheel, and consequently at the point where the wheel bears thereupon. In this way, a tight joint is produced. There is also preferably employed over the outer faces of the sections 17, plates 23, shown in Fig. 3, which cover the margins of the hinges, and one or more rollers 24 are also preferably placed over the shoe members above the wheel and bear thereupon to maintain a proper engagement between the parts. In addition, the wheel may be provided with shield plates 25 at its opposite sides, which plates extend just outside the flanges 12 and serve as dirt and dust guards.

Having thus fully described my invention what I claim as new and desire to secure by Letters Patent is:—

1. In a structure of the character set forth, the combination with a rotary member, of an endless shoe member surrounding the same, and an endless belt member that is interposed between the rotary member and the shoe member and is detachably interlocked therewith.

2. In a structure of the character set forth, the combination with a rotary member, of an endless shoe member surrounding the same and comprising a plurality of hingedly connected sections, and an endless belt member that is interposed between the rotary member and the shoe member, and is detachably interlocked with both.

3. In a structure of the character set forth, the combination with a rotary member, of an endless shoe member surrounding the same, and an endless belt member that is interposed between the rotary member and the shoe member and comprising a plurality of jointed sections that detachably interlock with the rotary member and with the shoe member.

4. In a structure of the character set forth, the combination with a rotary member, of an endless shoe member comprising a plurality of hingedly connected sections, and an endless belt member that is interposed between the rotary member and the shoe member and comprises a plurality of hingedly connected sections, the sections of one endless member bridging the joints between those of the other.

5. In a structure of the character set forth, the combination with a wheel, of an endless shoe member comprising jointed sections, and an endless member interposed between the wheel and shoe member and comprising sections that bridge the joints between the shoe sections on the lower side of the wheel.

6. In a structure of the character set forth, the combination with a wheel having a plurality of sockets in its periphery, of an endless shoe member comprising a plurality of hingedly connected sections having sockets in their inner sides, and an endless belt member interposed between the wheel and shoe member, and comprising hingedly connected sections having teeth on their opposite sides that respectively engage in the sockets of the wheel and shoe member.

7. In a structure of the character set forth, the combination with a wheel, of an endless shoe member surrounding the same and comprising sections, hinges connecting the sections and located on the inner sides of the same, a belt member interposed between the wheel and shoe member and comprising sections, and hinges connecting said latter sections and located on the outer sides thereof.

8. In a structure of the character set forth, the combination with a wheel, of an endless shoe member comprising hingedly connected sections that are channeled on their inner sides, and an endless belt section interposed between the wheel and shoe section and having interfitting engagements with both, said belt member operating in the channels of the shoe sections.

9. In a structure of the character set forth, the combination with a wheel, of an endless shoe member operating about the same, and a belt member interposed between the wheel and shoe member, said belt member having engagement with one portion of the shoe member on one side of the wheel and with a different portion on the opposite side.

10. In a structure of the character set forth, the combination with a wheel, of an endless shoe member coöperating therewith and comprising hingedly connected sections, each having a plurality of sockets, and an endless belt member interposed between the wheel and shoe member, said belt member having projections, each of which engages in one socket of the shoe member on one side of the wheel and a different socket of the shoe member on the opposite side of the wheel.

11. In a structure of the character set forth, the combination with a wheel having a plurality of sockets in its periphery, of an endless shoe member comprising hingedly connected sections, means for limiting the relative movement of the sections in one direction, an endless belt member interposed between the wheel and shoe member and comprising hingedly connected sections that are beveled to limit their relative movement in one direction, said members being provided with coöperating teeth and sockets, the sections of the belt member bridging the joints between the section of the shoe member on the under side of the wheel, and a roller located over the shoe member above the wheel to insure engagement between the upper portions of the members.

In testimony whereof I have signed my name to this specification in the presence of two attesting witnesses.

JOHN H. CARR.

Witnesses:
 ELLA EGGERT,
 ANNIE F. WALKER.